(12) United States Patent
Inman et al.

(10) Patent No.: US 11,469,004 B2
(45) Date of Patent: Oct. 11, 2022

(54) SPACE REACTOR GAS ASSIST CONTROL ROD RELEASE MECHANISM

(71) Applicant: BWXT Advanced Technologies, LLC, Lynchburg, VA (US)

(72) Inventors: James Brian Inman, Forest, VA (US); Gary W. Neeley, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 16/880,364

(22) Filed: May 21, 2020

(65) Prior Publication Data
US 2020/0373028 A1 Nov. 26, 2020

Related U.S. Application Data

(60) Provisional application No. 62/852,720, filed on May 24, 2019.

(51) Int. Cl.
*G21C 7/16* (2006.01)
*G21C 7/10* (2006.01)

(52) U.S. Cl.
CPC ...... *G21C 7/16* (2013.01); *G21C 7/10* (2013.01)

(58) Field of Classification Search
CPC ........ G21C 7/12–14; G21C 7/16; G21C 9/02; G21C 9/027; B64G 1/408
USPC ........ 376/219, 226, 230, 231, 233, 318, 909
See application file for complete search history.

(56) References Cited

U.S. PATENT DOCUMENTS

| | | | | |
|---|---|---|---|---|
| 3,038,846 A * | 6/1962 | Yeomans | ................. | G21C 7/16 376/223 |
| 3,108,054 A * | 10/1963 | Blackman, Jr. | .......... | G21D 5/02 376/318 |
| 3,124,513 A | 3/1964 | Hawke | | |
| 3,378,455 A * | 4/1968 | Rom | ........................ | G21D 9/00 376/432 |
| 3,383,858 A * | 5/1968 | Willinski | ............... | G21C 11/08 376/318 |
| 3,733,251 A * | 5/1973 | Gilbertson | ............... | G21C 7/12 376/233 |

(Continued)

FOREIGN PATENT DOCUMENTS

WO 2020/242880 A1 12/2020

OTHER PUBLICATIONS

International Search Report and Written Opinion, PCT/US2020/033988, dated Oct. 8, 2020, 7 pages.

*Primary Examiner* — Jack W Keith
*Assistant Examiner* — Jinney Kil
(74) *Attorney, Agent, or Firm* — Nelson Mullins Riley & Scarborough LLP (57) ABSTRACT

A control rod assembly for a nuclear reactor having a reactor core and a pressurized fluid source, including a control rod disposed within a control rod sleeve, a lead screw that is selectively secured to the control rod, a trip latch that is secured to a bottom end of the lead screw, the trip latch being selectively securable to a top end of the control rod, a control rod drive motor that is operably connected to the lead screw, and a valve that is in fluid communication with the pressurized fluid source of the nuclear reactor and is movable between a first position and a second position, wherein in the second position of the gas valve the trip latch is in an open position.

11 Claims, 8 Drawing Sheets

(56) References Cited

U.S. PATENT DOCUMENTS

| | | | |
|---|---|---|---|
| 3,741,867 A * | 6/1973 | Fortescue | G21C 7/14 |
| | | | 376/233 |
| 3,775,247 A | 11/1973 | Ode et al. | |
| 3,822,185 A | 7/1974 | Wetch | |
| 3,905,634 A * | 9/1975 | Johnson | G21C 19/105 |
| | | | 376/233 |
| 3,933,581 A * | 1/1976 | McKeehan | G21C 9/027 |
| | | | 376/230 |
| 4,030,972 A * | 6/1977 | Groves | G21C 7/16 |
| | | | 376/230 |
| 4,139,414 A * | 2/1979 | Giuggio | G21C 9/027 |
| | | | 376/337 |
| 4,863,673 A | 9/1989 | Carruth | |
| 2010/0067642 A1 | 3/2010 | Maruyama et al. | |

\* cited by examiner

SPACE REACTOR GAS ASSIST CONTROL ROD RELEASE MECHANISM

CLAIM OF PRIORITY

This application claims priority to U.S. Provisional Application No. 62/852,720, filed May 24, 2019, the entire disclosure of which is incorporated by reference herein.

TECHNICAL FIELD

The presently-disclosed invention relates generally to systems and methods of use thereof for controlling reactor power levels in nuclear thermal propulsion space reactors and, more specifically, to systems and methods of use thereof for control rod drive mechanisms for nuclear thermal propulsion space reactors.

BACKGROUND

Figures 1, 2A, 2B:
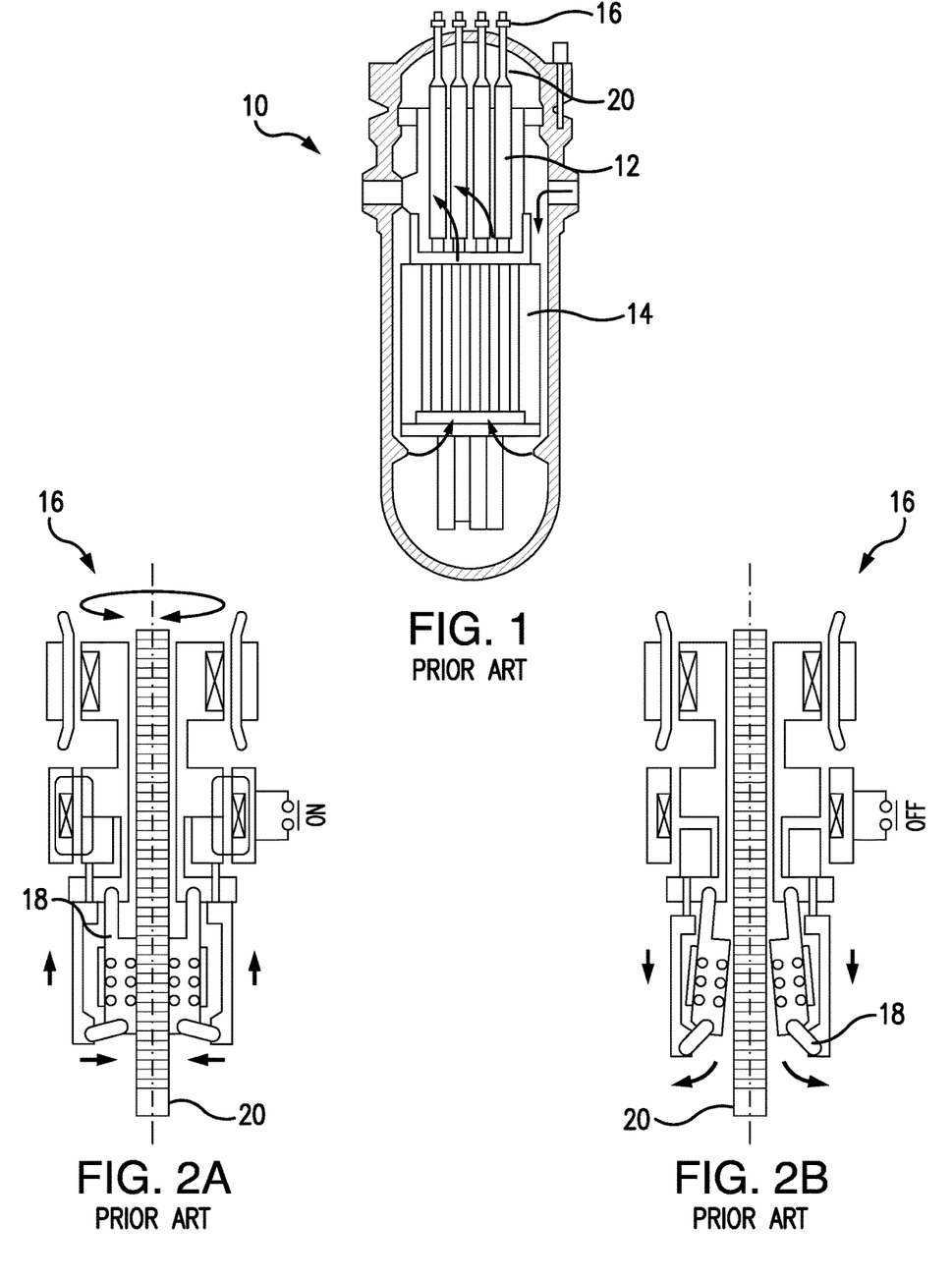
FIG. 1 is cross-sectional view of a prior art terrestrial pressurized water reactor.
FIGS. 2A and 2B are cross-sectional views of a control rod drive mechanism of the pressurized water reactor shown in FIG. 1.

In terrestrial pressurized water reactors (PWRs) 10, which constitute the majority of the world's nuclear power plants, the PWR 10 is primarily controlled by the insertion of internal control rods 12 that are located above the reactor core 14, as shown in FIG. 1. Note, the addition of neutron poisons into the coolant water can also be used to control reactors, but will not be addressed in this disclosure. Most control rod systems consist of three items: (1) a control rod drive motor (CRDM) 16 used to move the corresponding control rods 12 into and out of the reactor core 14 by rotating a roller nut 18 (FIG. 2) attached to a threaded drive shaft 20; (2) a threaded drive shaft 20 connected to the top of the control rod 12 and latched at the top of the control rod 12 by the CRDM's roller nut 18 (the threaded drive shaft 20 is driven into and out of the reactor core 14 by the CRDM 16); and (3) a control rod 12 (usually a cylindrical neutron absorbing poison) that travels into and out of the reactor core 14.

The neutron poison in the control rods 12 absorbs the neutrons that are used to provide criticality in nuclear reactors. The poison material in the control rods 12, when placed within the reactor core 14, absorbs enough neutrons to shut down the PWR 10. To control the PWR's power, the control rods 12 are removed axially in incremental steps in order to absorb only enough neutrons to maintain the PWR's criticality. During certain upset conditions, the PWR 10 performs an emergency shutdown, or SCRAM. During a SCRAM, the neutron-absorbing control rods 12 are inserted quickly into the reactor core 14. As stated above, in PWRs 10 the CRDMs 16 are located above the reactor core 14. During a SCRAM, the roller nuts 18 that secure to the threaded drive shafts 20 to the CRDMs 16 are mechanically or magnetically decoupled from the CRDMs 16, as shown in FIG. 2B. This allows the threaded drive shafts 20 and corresponding control rods 12 to drop by gravity into the reactor core 14, thereby stopping the chain reaction.

Figure 3:
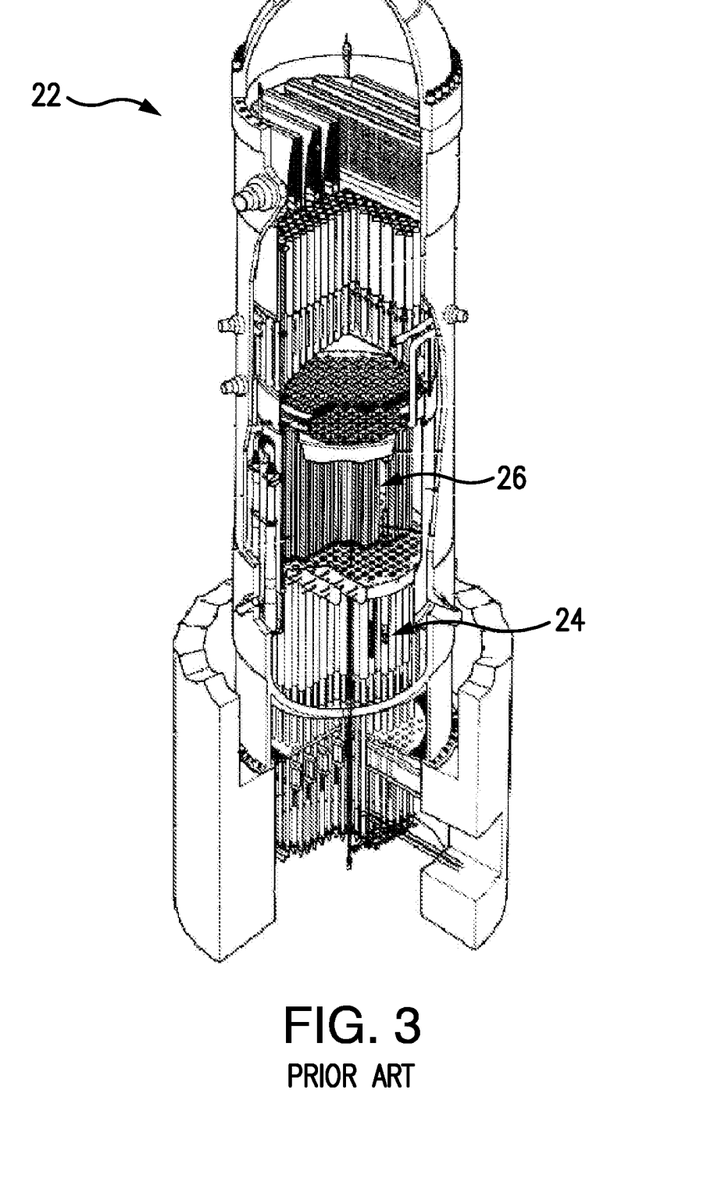
FIG. 3 is a cross-sectional view of a prior art terrestrial boiling water reactor.
Figure 4:
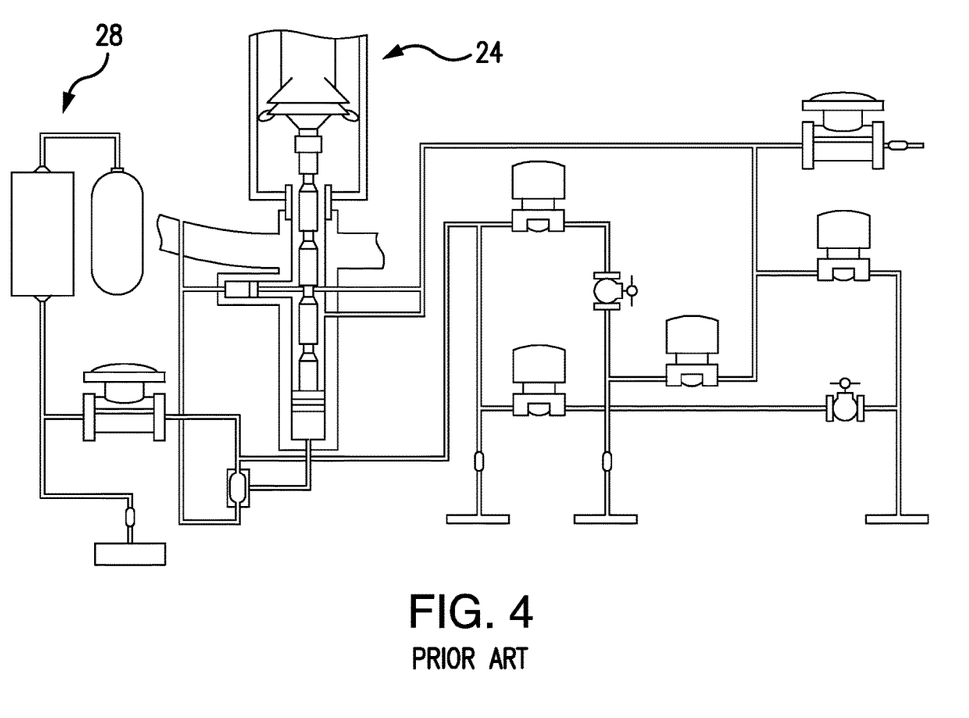
FIG. 4 is a diagram of control rod SCRAM equipment of the boiling water reactor shown in FIG. 3.

In terrestrial boiling water reactors (BWRs) 22, the second most common type of reactor in nuclear power plants, the reactor power is controlled by either changing the water flow through the BWR 22, changing neutron absorbing chemistry in the coolant water, or inserting or withdrawing control rods 24. For both BWRs 22 and PWRs 10, coolant water enters the core 26 and 14, respectively, from the bottom and exits from the top of the core. BWR control rods 24, located below the reactor core 26, are inserted from below, as shown in FIG. 3. In a BWR 22, the reactor coolant is heated as it flows upward through the reactor core 26. The water boils in the region at the top of the reactor core 26 making it less dense and, therefore, less efficient in thermalizing neutrons. Thermalized neutrons are required to sustain the fission process. The denser water at the bottom of the reactor core 26 results in a higher concentration of neutrons, which in turn makes the control rods 24 more efficient in being able to affect the fission process, or control reactivity. Therefore, in BWRs 22, the control rods 24 are inserted upwards from below the core. During a SCRAM of a BWR 22, gravity counteracts insertion of the control rods 24. The BWR control rods 24 are inserted by a high pressure hydraulic source 28, such as shown in FIG. 4.

Figure 5:
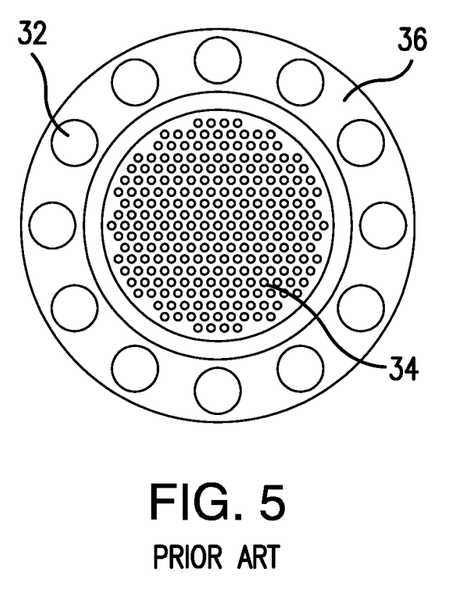
FIG. 5 is a diagram of a rotating control drum system of a prior art nuclear thermal propulsion space reactor.
Figure 6:
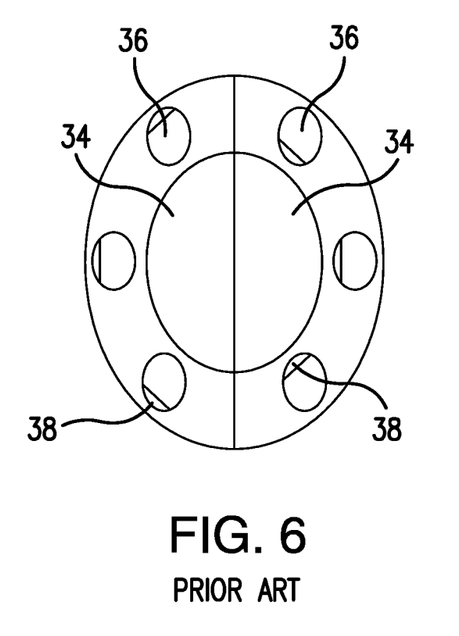
FIG. 6 is a diagram of a rotating control drum system of a prior art nuclear thermal propulsion space reactor.

The reactivity of a nuclear space reactor 30 (FIG. 7) is controlled by either exterior or interior control systems and cannot benefit from the use of gravity. The majority of exterior control systems for space reactors are controlled by rotating control drums 32, or barrels, that are located on the exterior of the reactor core 34, as shown in FIG. 5. Each rotating control drum 32 has both reflector material 36 and neutron absorbing material 38 within the drum 32, as shown in FIG. 6. During normal operations, the control drums 32 are positioned such that the reflecting material 36 is pointing towards the core 34, thereby directing the neutrons back into the reactor core 34, as shown on the left side of FIG. 6. During shutdown, the control drums 32 are positioned so that the neutron absorbing material 38 is pointing toward the reactor core 34, thereby absorbing enough neutrons to shutdown the reactor core 34, as shown on the right side of FIG. 6.

There at least remains a need, therefore, for systems and methods for controlling reactor power levels in nuclear space reactors.

SUMMARY OF INVENTION

One embodiment of the present invention provides a control rod assembly for a nuclear reactor having a reactor core and a pressurized fluid source, including a control rod disposed within a control rod sleeve, a lead screw that is selectively secured to the control rod, a trip latch that is secured to a bottom end of the lead screw, the trip latch being selectively securable to a top end of the control rod, a control rod drive motor that is operably connected to the lead screw, and a valve that is in fluid communication with the pressurized fluid source of the nuclear reactor and is movable between a first position in which the pressurized fluid source is isolated from the control rod sleeve and a second position in which the pressurized fluid source is in fluid communication with the control rod sleeve, wherein in the first position of the gas valve the trip latch is in a closed position and in the second position of the gas valve the trip latch is in an open position.

Another embodiment of the present invention provides a nuclear reactor having a reactor core, a pressurized fluid source, and a control rod assembly including a control rod disposed within a control rod sleeve, a lead screw, a trip latch that is secured to a bottom end of the lead screw, the trip latch being selectively securable to a top end of the control rod, a control rod drive motor that is operably connected to the lead screw, and a valve that is in fluid communication with the pressurized fluid source of the nuclear reactor and is movable between a first position in which the pressurized fluid source is isolated from the control rod sleeve and a second position in which the pressurized fluid source is in fluid communication with the control rod sleeve, wherein in the first position of the gas valve the trip latch is in a closed position and in the second position of the gas valve the trip latch is in an open position.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is related to the use of interior control rods in nuclear space reactors as either the primary control system and/or only as the reactor shutdown system. Interior control rods may also be used as an independent, alternative shutdown system separate from the primary control drum (barrel) control system. As a secondary shutdown system, the backup control rods could be inserted into the reactor core during launch of the space vehicle for additional shutdown capability in case of a launch failure in which the core becomes submerged in water. After a successful launch and obtaining a safe orbit, the secondary interior control rods would be driven from the reactor core and the reactor startup/control would be governed entirely by the exterior rotating control drums. As the secondary shutdown system, the interior control rods would only be used to shut down the reactor if the primary control system fail. Of note for the present invention, when a nuclear space reactor is in space, gravity cannot assist in re-inserting interior control rods as with the previously discussed PWRs.

Various advantages of a space reactor gas assist control rod release mechanism (CRRM) are as follows: the disclosed CRRM allows the control rods to be rapidly inserted into the core without the assistance of gravity; no additional high pressurant is required beyond the normal nuclear thermal reactor space craft pressurized gas; there is no affect with regard to changing the control rod arrangement within the reactor core; valves within the system may be arranged to allow for multiple control rods to be activated from a single gas valve; and the system may be used for terrestrial gas reactors. Before discussing a preferred embodiment of a space reactor gas assist CRRM in accordance with the present invention, a discussion of the basic principles of nuclear thermal propulsion space reactors is presented.

Figure 7:
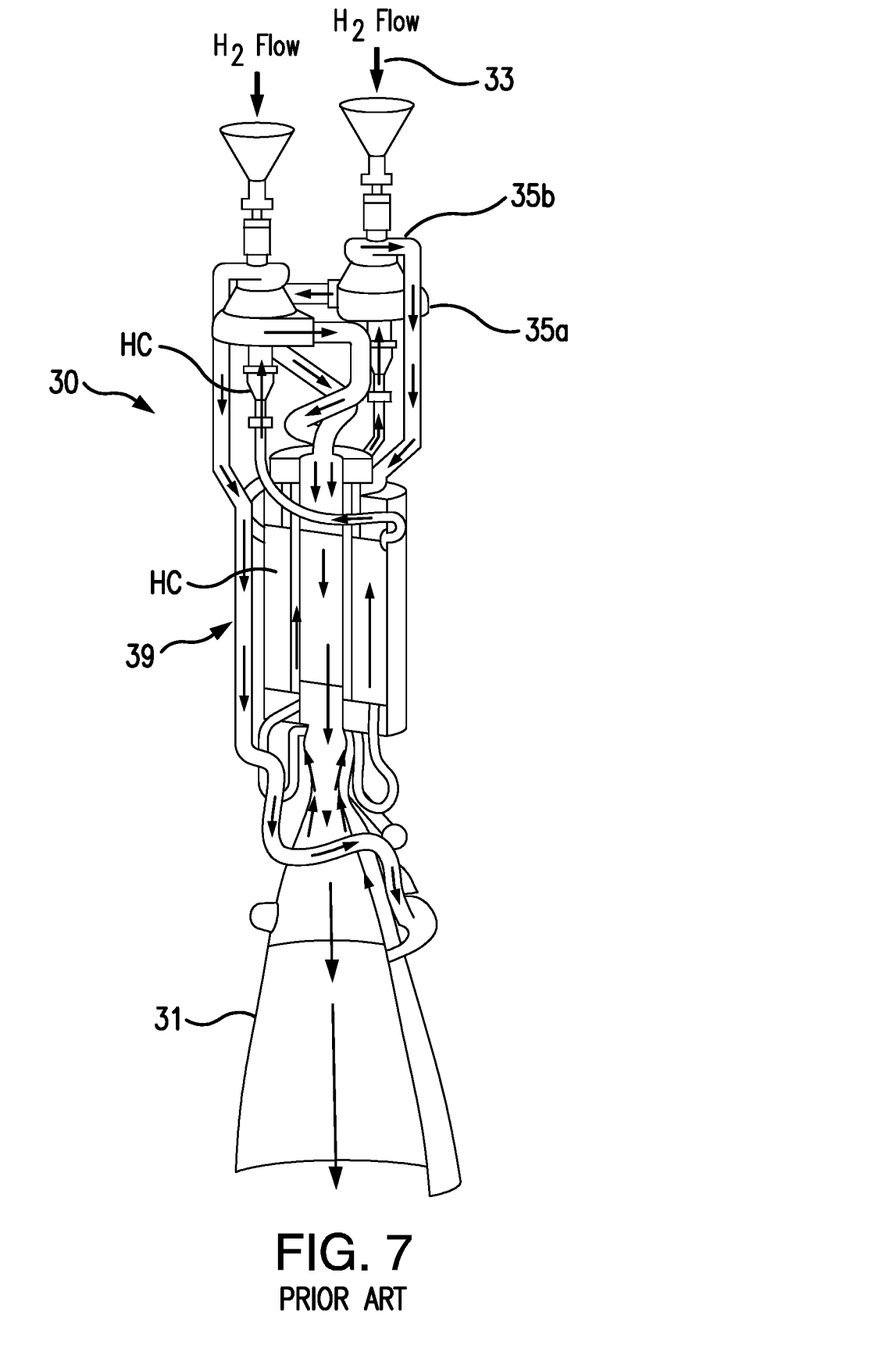
FIG. 7 is a partial cross-sectional view of a nuclear thermal propulsion space reactor.

Referring now to FIG. 7, the basic principle of a nuclear thermal propulsion space reactor 30 is to heat coolant, usually hydrogen gas, to high temperatures by the nuclear reactor and expel the gas through a rocket nozzle 31 to create thrust. Nuclear thermal propulsion space reactors (here and after referred to as NSRs) are pressure-fed engines requiring pressurized coolant 33 to overcome the coolant pressure drop that occurs in the narrow coolant passageways throughout the reactor. Pressure-fed systems consist of either a tank pressure-fed system, pump-fed system, or a combination of both. In tank pressure-fed systems, the high pressure fuel tank drives the coolant directly through the reactor. A pump-fed system is illustrated in FIG. 7. With pump-fed systems, a turbo-compressor pump 35a/35b takes heated coolant HC that was previously used to cool the reactor components to drive a turbine 35a whose shaft is directly coupled to a compressor pump 35b. It is this pressurized gas, either from the compressor or from the turbo pump, that is used to supply the present CRRM.

Figure 8:
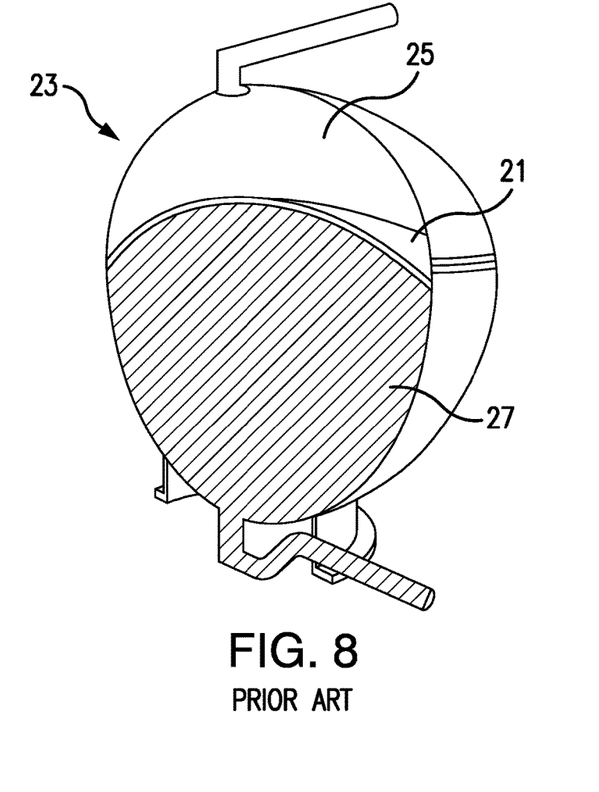
FIG. 8 is a pressurized fuel tank of a prior art nuclear thermal propulsion space reactor.

In space, at initial startup of liquid fueled rockets, the fuel or coolant that is stored within a fuel tank can have a sloshing effect within the tank due to the zero-gravity environment. This sloshing fuel can disrupt the required supply of fuel to the compressor resulting in compressor damage. A method to eliminate fuel sloshing is placing a diaphragm 21 within the fuel tank 23 so that it is disposed between a pressurization gas 25 and the fuel 27, as shown in FIG. 8. The pressurized gas 25 pushes the diaphragm 21 and fuel 27 so as to provide a continuous fuel flow to the turbo-compressor pump 35a/35b (FIG. 7). Note, once the acceleration force from the rocket exhaust begins, the acceleration of the space craft forces the fuel to settle at the bottom of the fuel tank 23 and provides a continuous fuel supply to the turbo-compressor pump intake. The pressurized gas source utilized to prevent the sloshing of fuel may also be used to supply pressurized gas to the present CRRM, as discussed in greater detail below.

Figure 9:
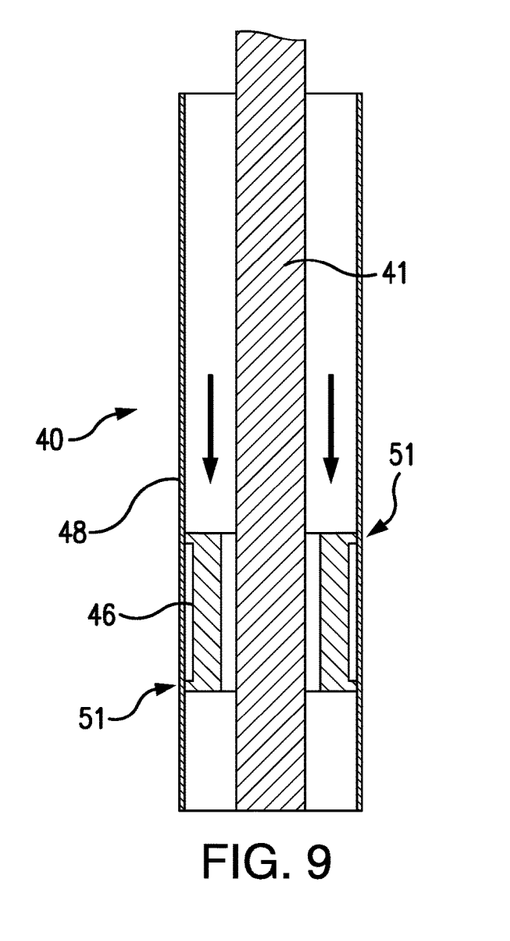
FIG. 9 is a cross-sectional view of an air cylinder of a nuclear thermal propulsion space reactor gas assist control rod release mechanism (CRRM) in accordance with an embodiment of the present invention.

Referring now to FIG. 9, a CRRM 40 in accordance with the present invention provides a way to SCRAM control rods 42 (FIG. 10) into a reactor core 44 that is in space, without the assistance of gravity. As shown, the control rod 42 is made to act as a piston 46 within a cylinder 48, with pressurized gas from the fuel tank 23 (FIG. 8), or turbo-compressor 35a/35b (FIG. 7), utilized to drive the control rod(s) 42 rapidly into the reactor core 44. Preferably, a piston 46 or enlarged portion of the control rod 42, forms a gas-tight seal (at 51) so that the pressurized gas drives the corresponding control rod 42 into the reactor core 44 when acting on the piston 46.

Figure 10A:
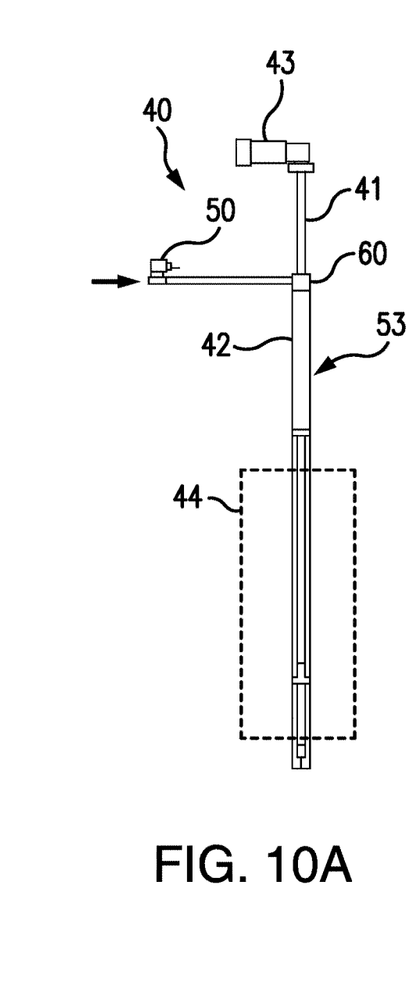
FIGS. 10A through 10E are partial cross-sectional views of a gas-driven emergency (SCRAM) shutdown sequence of the CRRM in accordance with the present invention.
Figure 10B:
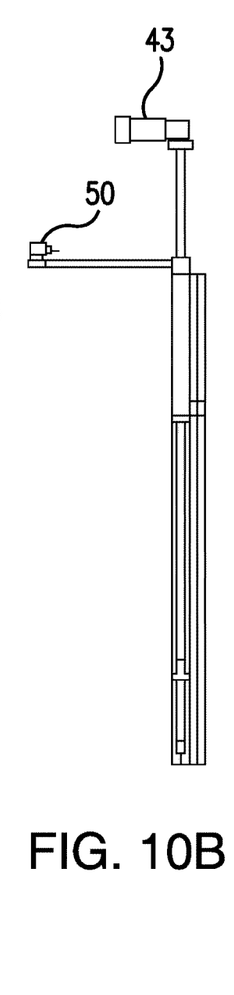

Referring now to FIGS. 10A through 10E, an operation sequence of the CRRM 40 during an emergency (SCRAM) shutdown in a space nuclear reactor is shown. As shown in FIG. 10A, the control rod 42 is in the retracted position outside of the reactor core 44. The control rod 42 is positioned by the CRDM 43, and the gas valve 50 of the pressurized gas source is closed. An optional O-ring seal 52 for forming a gas-tight seal around the control rod 42 is shown in FIG. 10B.

Figure 10C:
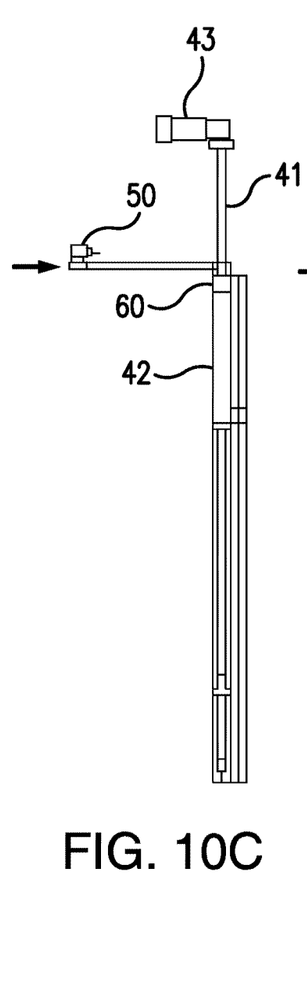
Figure 10D:
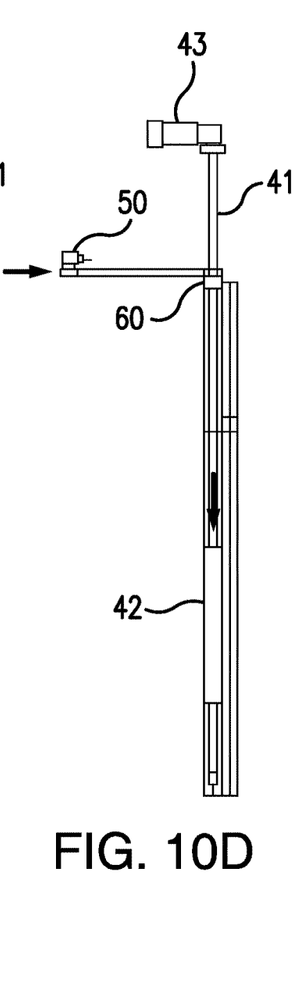
Figure 10E:
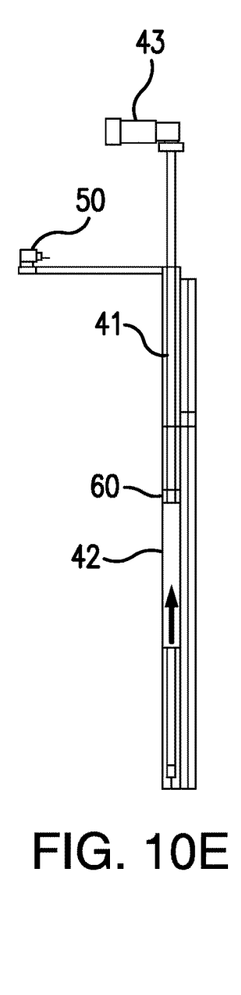
Figure 11A:
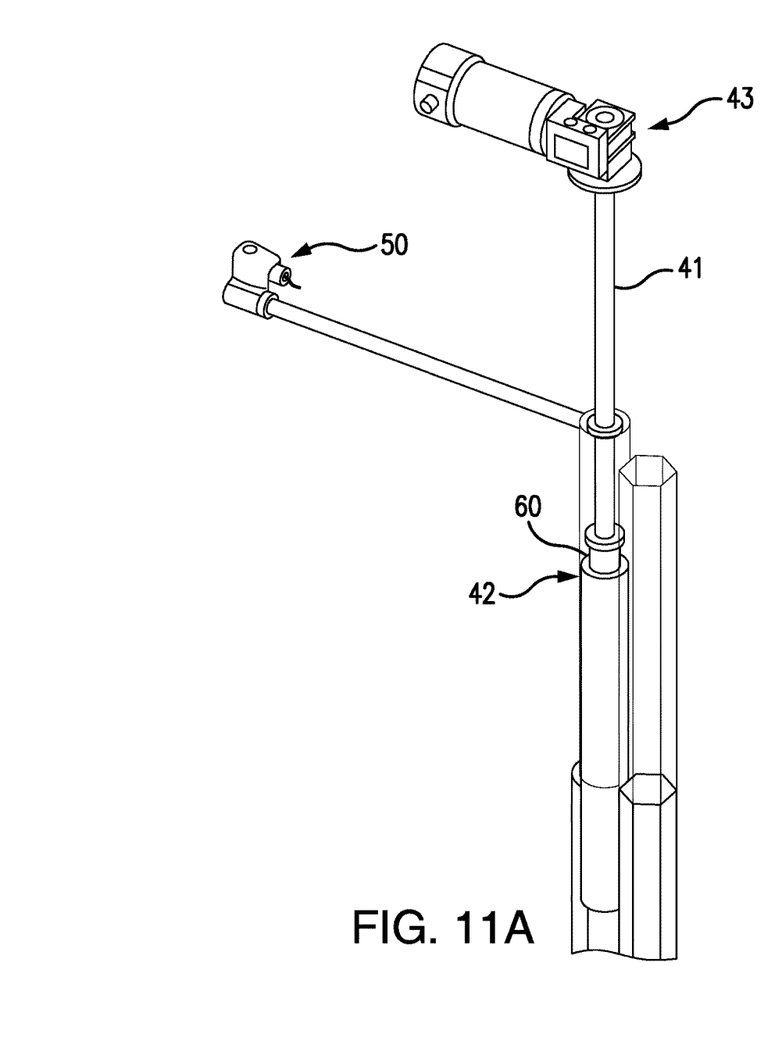
FIGS. 11A and 11B are perspective views of a control rod trip latch in accordance with an embodiment of the present invention.
Figure 11B:
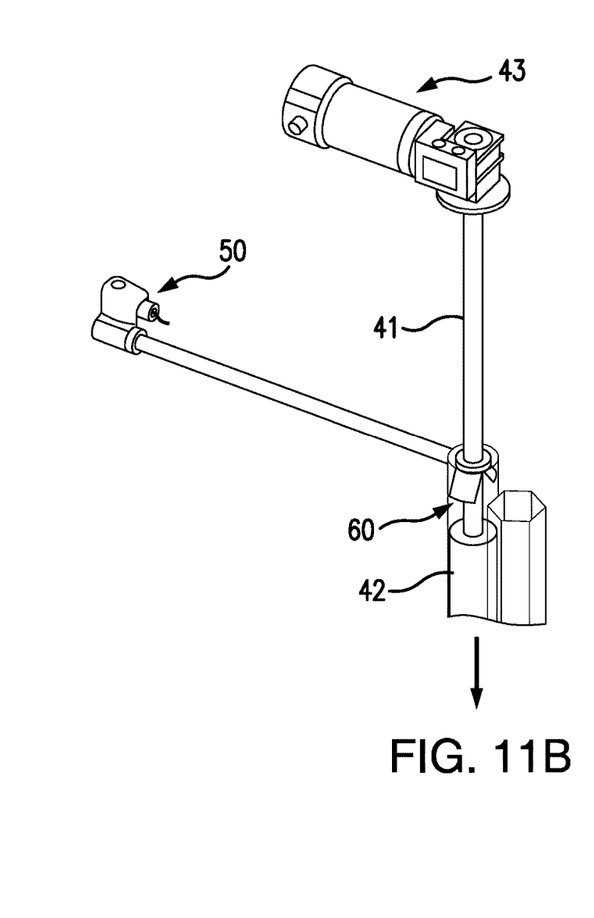

Referring now to FIG. 10C, upon the initiation of a SCRAM sequence, the gas valve 50 opens, thereby allowing pressurized gas from the fuel tank 23 (FIG. 8), or turbo-compressor pump 35a/35b (FIG. 7), to enter the control rod enclosure 53. The high pressure gas trips the trip latch 60 open that selectively attaches the control rod 42 to threaded drive shaft 41, as best seen in FIGS. 11A and 11B. Optionally, the trip latch 60 may be activated by deactivating a magnetic latch or activated mechanically by an electrical signal (not shown). As shown in FIG. 10D, with the trip latch 60 open, the pressurized gas drives the control rod 42 into the reactor core 44, where it absorbs neutrons and shuts down the core's reactivity. As shown in FIG. 10E, to restart the reactor, the control rod trip latch 60 is closed by removing gas pressure therefrom. Next, the CRDM 43 is activated and drives the trip latch 60 down the threaded drive shaft 41 where it re-attaches to the control rod 42. The gas valve 50 is closed and the gas within the control rod enclosure 53 is vented. The CRDM 43 retracts the control rod 42 based upon the reactor's start up sequence.

Various gas delivery systems may be used to supply the high-pressure gas to the space reactor gas assist CRRM 40. For example, pressurized gas sources may include, but are not limited to, a dedicated control rod shutdown gas supply tank, high pressure thrust exhaust gas exiting the nuclear thermal rocket nozzle, fuel tank pressurant gas, high-pressure gas from the turbo-compressor system, and high-pressure hydraulic supply systems may be used.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A control rod assembly for a nuclear reactor having a reactor core and a pressurized fluid source, comprising:
   a control rod disposed within a control rod sleeve;
   a piston disposed on the control rod;
   a lead screw that is selectively secured to the control rod;
   a pneumatically-operated trip latch that is secured to a bottom end of the lead screw, the trip latch being selectively securable to a top end of the control rod and movable between a closed position and an open position, wherein when the trip latch is in the open position the control rod is not secured to the lead screw;
   a control rod drive motor that is operably connected to the lead screw; and
   a gas valve that is configured to be in fluid communication with the pressurized fluid source of the nuclear reactor and
      wherein with the gas valve in fluid communication with the pressurized fluid source, the gas valve is movable between
         a first position in which the pressurized fluid source is isolated from the control rod sleeve and
         a second position in which the pressurized fluid source is in fluid communication with the control rod sleeve;
   wherein
      in the first position of the gas valve the pressurized fluid source is isolated from the trip latch and the trip latch is in the closed position and
      in the second position of the gas valve the pressurized fluid source is in fluid communication with both the piston and the trip latch to trip the trip latch into the open position,
         wherein with the trip latch in the open position, pressurized fluid from the pressurized fluid source acts against the piston to drive the control rod.

2. The control rod assembly of claim 1, wherein when the trip latch is in the open position the control rod is released from the lead screw.

3. The control rod assembly of claim 2, wherein when the gas valve is in the second position the control rod is driven into the reactor core by the pressurized fluid source.

4. The control rod assembly of claim 1, wherein the pressurized fluid source is a pneumatic source.

5. The control rod assembly of claim 1, wherein the piston forms a gas-tight seal with the inner surface of the control rod sleeve.

6. A nuclear reactor comprising:
   a reactor core;
   a pressurized fluid source; and
   a control rod assembly comprising:
      a control rod disposed within a control rod sleeve;
      a piston disposed on the control rod;
      a lead screw that is selectively secured to the control rod;
      a pneumatically-operated trip latch that is secured to a bottom end of the lead screw, the trip latch being selectively securable to a top end of the control rod and movable between a closed position and an open position, wherein when the trip latch is in the open position the control rod is not secured to the lead screw;
      a control rod drive motor that is operably connected to the lead screw; and
      a gas valve that is in fluid communication with the pressurized fluid source of the nuclear reactor and
         wherein with the gas valve in fluid communication with the pressurized fluid source, the gas valve is movable between
            a first position in which the pressurized fluid source is isolated from the control rod sleeve and
            a second position in which the pressurized fluid source is in fluid communication with the control rod sleeve;

wherein
> in the first position of the gas valve the pressurized fluid source is isolated from the trip latch and the trip latch is in the closed position and
>
> in the second position of the gas valve the pressurized fluid source is in fluid communication with both the piston and the trip latch to trip the trip latch into the open position,
>> wherein with the trip latch in the open position, pressurized fluid from the pressurized fluid source acts against the piston to drive the control rod.

7. The control rod assembly of claim 6, wherein when the trip latch is in the open position the control rod is released from the lead screw.

8. The control rod assembly of claim 7, wherein when the gas valve is in the second position the control rod is driven into the reactor core by the pressurized fluid source.

9. The control rod assembly of claim 6, wherein the nuclear reactor further comprises a nuclear thermal propulsion space reactor.

10. The control rod assembly of claim 6, wherein the pressurized fluid source is a pneumatic source.

11. The control rod assembly of claim 6, wherein the piston forms a gas-tight seal with the inner surface of the control rod sleeve.

* * * * *